(12) United States Patent
Chen et al.

(10) Patent No.: US 10,386,481 B1
(45) Date of Patent: Aug. 20, 2019

(54) ANGLE-OF-ARRIVAL-BASED GESTURE RECOGNITION SYSTEM AND METHOD

(71) Applicant: KING ABDULLAH UNIVERSITY OF SCIENCE AND TECHNOLOGY, Thuwal (SA)

(72) Inventors: Hui Chen, Thuwal (SA); Tarig Ballal Khidir Ahmed, Thuwal (SA); Mohamed Saadeldin, Thuwal (SA); Tareq Yousef Al-Naffouri, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 16/040,191

(22) Filed: Jul. 19, 2018

(51) Int. Cl.
  *G08B 21/00* (2006.01)
  *G01S 15/58* (2006.01)
  *G01S 15/87* (2006.01)
  *G06F 3/01* (2006.01)

(52) U.S. Cl.
  CPC ............ *G01S 15/58* (2013.01); *G01S 15/876* (2013.01); *G06F 3/017* (2013.01)

(58) Field of Classification Search
  CPC ......... G01S 15/58; G01S 15/876; G06F 3/017
  USPC ........................................................ 367/93
  See application file for complete search history.

(56) References Cited

U.S. PATENT DOCUMENTS

| 2011/0320165 | A1* | 12/2011 | Miyamoto | G06F 3/0354 702/150 |
| 2012/0001875 | A1* | 1/2012 | Li | G01S 7/5273 345/177 |
| 2012/0206339 | A1* | 8/2012 | Dahl | G06F 3/043 345/156 |

(Continued)

OTHER PUBLICATIONS

Amma, C., et al., "Airwiring: A Wearable Handwriting Recognition System," Personal and Ubiquitous Computing, Feb. 24, 2013, pp. 191-203.

(Continued)

*Primary Examiner* — Mark S Rushing
(74) *Attorney, Agent, or Firm* — Patent Portfolio Builders PLLC

(57) ABSTRACT

A method and system for gesture recognition using angle-of-arrival information. The method includes generating ultrasound waves with a transmitter; receiving the ultrasound waves at a receiver that includes two pairs of sensors that record the ultrasound waves; estimating with a processor, first and second angle-of-arrivals $\theta_x(t_i),\theta_y(t_i)$ for the ultrasound waves, where x and y indicate two perpendicular axes that form a plane in which the two pairs of sensors are distributed and the first and second angle-of-arrivals are defined relative to the plane; grouping N estimated first and second angle-of-arrivals $\theta_x(t_i),\theta_y(t_i)$ values to form a matrix g that corresponds to the predetermined path; comparing the matrix g with plural gesture templates from a gesture dictionary; identifying a gesture template from the plural gesture templates that corresponds to the predetermined path; and displaying the gesture template associated with the predetermined path.

20 Claims, 15 Drawing Sheets

(56) References Cited

U.S. PATENT DOCUMENTS

| | | | | |
|---|---|---|---|---|
| 2015/0054794 | A1* | 2/2015 | Li | G06F 3/017 345/177 |
| 2015/0242002 | A1* | 8/2015 | Altman | G06F 3/017 345/173 |
| 2015/0293599 | A1* | 10/2015 | Shih | G06F 3/04847 345/173 |
| 2015/0346834 | A1* | 12/2015 | Martinez Fernandez | G06F 3/017 340/12.5 |
| 2017/0329403 | A1* | 11/2017 | Lai | G06F 3/014 |

OTHER PUBLICATIONS

Amma, C., et al., "Airwriting: Hands-free Mobile Text Input by Spotting and Continuous Recognition of 3d-Space Handwriting with Inertial Sensors," 2012 16th International Symposium on Wearable Computers, Newcastle, UK, Jun. 18-22, 2012, pp. 52-59, IEEE Computer Society.

Chen, M., et al., "Air-Writing Recognition—Part I: Modeling and Recognition of Characters, Words, and Connecting Motions," IEEE Transactions on Human-Machine Systems, Jun. 2016, vol. 46, No. 3, pp. 403-413.

Chen, M., et al., "Air-Writing Recognition—Part II: Detection and Recognition of Writing Activity in Continuous Stream of Motion Data," IEEE Transactions on Human-Machine Systems, Jun. 2016, vol. 46, No. 3, pp. 436-444.

Islam, R., et al., "Alphabet Recognition in Air Writing Using Depth Information," ACHI 2016 : The Ninth International Conference on Advances in Computer-Human Interactions, Venice, Italy, Apr. 2016, pp. 299-301.

Piekarczyk, M., et al., "The Touchless Person Authentication Using Gesture-types Emulation of Handwritten Signature Templates," 2015 10th International Conference on Broadband and Wireless Computing, Communications and Applications, Nov. 4-6, 2015, pp. 132-136, IEEE.

Vikram, S., et al., "Handwriting and Gestures in the Air, Recognizing on the Fly," CHI 2013 Extended Abstracts, Apr. 27-May 2, 2013, Paris, France.

Ballal, T., et al.,; "Doa estimation for a multi-frequency signal using widely-spaced sensors,"; 2010 18th European Signal Processing Conference; Aug. 2010; pp. 691-695; Aalborg, Denmark.

Biswas, K.K., et al., "Gesture Recognition Using Microsoft Kinect®"; Proceedings of the 5th International Conference on Automation, Robotics and Applications (ICARA), Dec. 2011; pp. 100-103; Wellington, New Zealand.

Demuth, H., et al.; "Neural Network Toolbox 6—Users Guide"; MATLAB, The MathWorks; Sep. 2009; 558 pages.

Gupta, S., et al.; "Soundwave: using the doppler effect to sense gestures," in Proceedings of the SIGCHI Conference on Human Factors in Computing Systems. ACM, May 5, 2012, pp. 1911-1914.

Kellogg, B., et al.; "Bringing Gesture Recognition to All Devices"; Proceedings of the 11th USENIX Symposium on Networked Systems Design and Implementation NSDI '14); vol. 14; Apr. 2014; pp. 303-316; Seattle, Washington, USA.

LeCun, Y., et al.; "The mnist database of handwritten digits"; 1998. [downloaded from internet at http://yann.lecun.com/exdb/mnist/ on Aug. 6, 2018]; 8 pages.

Liang, R. H., et al.; "A real-time continuous gesture recognition system for sign language min Automatic Face and Gesture Recognition"; Proceedings of the Third IEEE International Conference on Automatic Face and Gesture Recognition; Apr. 1998, pp. 558-567.

Mitra, S., et al.; "Gesture Recognition: A Survey"; IEEE Transactions on Systems, Man, and Cybernetics—Part C: Applications and Reviews, vol. 37, No. 3; May 2007; pp. 311-324.

Qifan, Y., et al.; "Dolphin: Ultrasonic-based gesture recognition on smartphone platform," 2014 IEEE 17th International Conference on Computational Science and Engineering (CSE); Dec. 19-21, 2014, pp. 1461-1468.

Ren, Z., et al., "Robust Part-Based Hand Gesture Recognition using Kinect Sensor," IEEE Transactions on Multimedia, vol. 15, No. 5; Feb. 25, 2013; pp. 1110-1120.

Stergiopoulou, E., et al.; "Hand Gesture Recognition Using a Neural Network Shape Fitting Technique," Engineering Applications of Artificial Intelligence, vol. 22, No. 8; Jan. 2009; pp. 1141-1158.

Zhang, X., et al.; "A new writing experience: Finger writing in the air using a kinect sensor," IEEE MultiMedia; vol. 20, No. 4, Oct.-Dec. 2013; pp. 85-93.

Zimmerman, T. G., et al.; "A hand gesture interface device," in ACM SIGCHI Bulletin, vol. 18, No. 4; ACM; Apr. 1987, pp. 189-192.

\* cited by examiner

Table I
Angle of Arrival Accuracy Test

| | 0° | 15° | 30° | 45° | 60° | 75° |
|---|---|---|---|---|---|---|
| RMSE | 1.966 | 1.925 | 1.691 | 2.520 | 0.604 | 1.102 |
| Bias | -1.955 | -1.895 | -1.620 | -2.470 | -0.145 | 0.155 |
| STD | 0.207 | 0.339 | 0.487 | 0.500 | 0.588 | 1.094 |

FIGURE 10

Table II
Confusion Matrix of Dictionary-Based Classifier

| Actual Gesture | Classified Gestures (95.5% of 1000 gestures) | | | | | | | | | |
|---|---|---|---|---|---|---|---|---|---|---|
| | '1' | '2' | '3' | '4' | '5' | '6' | '7' | '8' | '9' | '0' |
| '1' | 96 | | | | | | 3 | 1 | | |
| '2' | 4 | 91 | | | | | 5 | | | |
| '3' | 5 | 1 | 91 | | | | 3 | | | |
| '4' | | | | 81 | | 5 | | | 9 | 5 |
| '5' | 3 | | | | 95 | | | 1 | 1 | |
| '6' | | | | | | 97 | | | | 3 |
| '7' | 9 | | | | | | 91 | | | |
| '8' | | | | | | | 1 | 99 | | |
| '9' | | | | | | 1 | 1 | | 97 | 1 |
| '0' | | | | | | | | | | 99 |

FIGURE 12

Table III

| Classifier | Dictionary | $M_{angle}$ | $M_{std}$ | $M_{cons}$ |
|---|---|---|---|---|
| Accuracy | 95.5% | 94.4% | 66.5% | 91.1% |

FIGURE 13

ANGLE-OF-ARRIVAL-BASED GESTURE RECOGNITION SYSTEM AND METHOD

BACKGROUND

Technical Field

Embodiments of the subject matter disclosed herein generally relate to a system for air writing, and more specifically, to motion tracking and text recognition devices and methods.

Discussion of the Background

Human gestures are indispensable tools for expressing emotions and conveying information to others. Gestures are also involved in human-machine interactions, HMI (human-machine interactive), as most users today are interacting with electronic products as smartphones, smart TVs, somatosensory games, virtual reality, augmented reality and so on, that require human input. As alternatives to traditional devices for providing this input, e.g., keyboards, touchpads or other pressing and touching tools, new technologies based on cameras, acceleration sensors, photosensors, electromagnetic signals and ultrasound are emerging as new mediums of interaction with these smart products.

Existing vision-based methods for interacting with the smart products separate the target (i.e., the user) from the background and then extract the hand location information from the recorded frames. Even though current commercial depth cameras improve its sensitivity to surrounding illumination conditions, the high computational complexity remains a challenge for such a device. Wi-Fi signals are cheap and ubiquitous nowadays owing to the developing of the Internet and hence become the attainable medium for the users. Wi-Fi-based systems even work for through-the-wall environment, which significantly extends the detection coverage in a complicated indoor environment. However, the subtle change of the movement is hard to be captured by the existing Wi-Fi based products.

Other products are based on the Doppler effect, i.e., the reflected signal from the moving objects will have a frequency-shift and this frequency-shift can be measured to determine the gesture. SoundWave [1] and Dolphin [2] are two systems designed to recognize a limited set of gestures. IMU-based systems, such as data gloves [3], [4], are able to detect even fingertip movement, but the drawback of these devices is the unpleasant user experience caused by the bulky wearable equipment.

Other solutions such as thermal image and Vive Lighthouse also exist. However, the former one suffers from resolution and high sensitivity to other people, while the price and required powerful processing machine for Vive VR device exclude a majority of ordinary customers. These gesture recognition systems vary from each other and can be compared in several dimensions such as signal accuracy, resolution, latency, motion range, user comfort and cost.

While the interactions between humans and machines have been improved by the above systems, compared to the spoken language, gestures are limited in the amount of information that they convey. As a result, the concept of air-writing has been introduced. This new interactive way yields flexibility in writing without touching or hand-eye coordination and it has a large potential in education, entertainment and virtual reality applications [5], [6].

Generally speaking, air writing is carried out in two steps. Hand motion is first tracked by the system by measuring the absolute or relative locations of the hand. This can be realized by estimating the true locations through trilateration in a sensor network or calculating relative locations through acceleration or gravity sensors. Then, classification models are used to recognize the text associated with the hand motion. Usually, normalization and feature extraction are performed on the data before sending it to the classifiers.

For air-writing recognition, identifying the letters is the first task for the recognition system since they are the very elementary composition of the words and sentences. The classifiers for the letters can be divided into two groups, depending on the requirement for training or not. The first group creates templates for all the possible alphabets. Thus, these training-free classifiers can recognize the letter based on the distance or the similarity between the received letter and the templates. Dynamic time warping is a classical algorithm to calculate the distance between an observed sequence of data and a template while cross-correlation gives the similarity instead. The second group, machine learning algorithms such as artificial Neural Network and Hidden Markov Model are training-based methods. An adequate amount of data needs to be collected to make the model adaptive to diverse writing styles.

However, all the above systems and methods lack the accuracy of correctly identifying a large set of hand gestures, which restricts the application of these systems. Therefore, there is a need for a new method for recognizing a large set of hand gestures that is not computationally intensive and also is more accurate than the existing methods and systems.

SUMMARY

According to an embodiment, there is a method for gesture recognition using angle-of-arrival information. The method includes generating ultrasound waves with a transmitter, wherein the ultrasound waves are simultaneously emitted by the transmitter while moving according to a predetermined path; receiving the ultrasound waves at a receiver, the receiver including two pairs of sensors that record the ultrasound waves; estimating with a processor, first and second angle-of-arrivals $\theta_x(t_i),\theta_y(t_i)$ for the ultrasound waves, where x and y indicate two perpendicular axes that form a plane in which the two pairs of sensors are distributed and the first and second angle-of-arrivals are defined relative to the plane; grouping N estimated first and second angle-of-arrivals $\theta_x(t_i),\theta_y(t_i)$ values to form a matrix g that corresponds to the predetermined path; comparing the matrix g with plural gesture templates from a gesture dictionary; identifying a gesture template from the plural gesture templates that corresponds to the predetermined path; and displaying the gesture template associated with the predetermined path.

According to another embodiment, there is a system for gesture recognition using angle-of-arrival information. The system includes a transmitter that generates ultrasound waves, wherein the ultrasound waves simultaneously emitted by the transmitter while moving according to a predetermined path; a receiver that receives the ultrasound waves, the receiver including two pairs of sensors that record the ultrasound waves; and a processor connected to the receiver. The processor is configured to estimate first and second angle-of-arrivals $\theta_x(t_i),\theta_y(t_i)$ for the ultrasound waves, where x and y indicate two perpendicular axes that form a plane in which the two pairs of sensors are distributed and the first and second angle-of-arrivals are defined relative to the plane, group N estimated first and second angle-of-arrivals $\theta_x(t_i),\theta_y(t_i)$ values to form a matrix g that corresponds to the predetermined path, compare the matrix g with plural gesture templates from a gesture dictionary, and identify a gesture template from the plural gesture templates that corresponds to the predetermined path.

According to still another embodiment, there is a non-transitory computer readable medium including computer executable instructions, wherein the instructions, when executed by a processor, implement instructions for gesture recognition using angle-of-arrival information as discussed above.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 10 illustrates an accuracy of the estimated angles;

FIG. 12 illustrates a confusion matrix for the dictionary;

FIG. 13 illustrates a comparison between gestures identified with a neural network classifier and a dictionary classifier;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an angle of arrival of ultrasound waves. However, the invention is not limited to ultrasound waves. Other waves can be used.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel system for hand gesture recognition is proposed. In the proposed system, the movement of a hand (or any other object) is tracked based on the angle-of-arrival (AoA) information of the received ultrasound signals. A handheld ultrasonic transmitter (e.g., game console, remote control, mouse, etc.) that can be triggered to send multi-frequency signals is used in this system. After detecting the signals, a controller or processor associated with the ultrasonic receiver array extracts horizontal and vertical angle information to represent the real-time location of the transmitter. To classify the angle observations into gestures, machine learning methods can be used. There have been a variety of machine learning approaches such as SVM (Support Vector Machine), HMM (Hidden Markov Machine), NN (Neural Networks) to classify gestures. Other methods like FSM (Finite State Machine) and particle filters can also be used. However, these methods require high computational complexity and the machine learning models need a large database of training data. To handle this problem in a more efficient way, according to an embodiment, it is possible to use a redundant dictionary-matching classifier to simplify the classification process. The results of this classifier are compared with a neural network based classification as discussed later.

Figure 1:
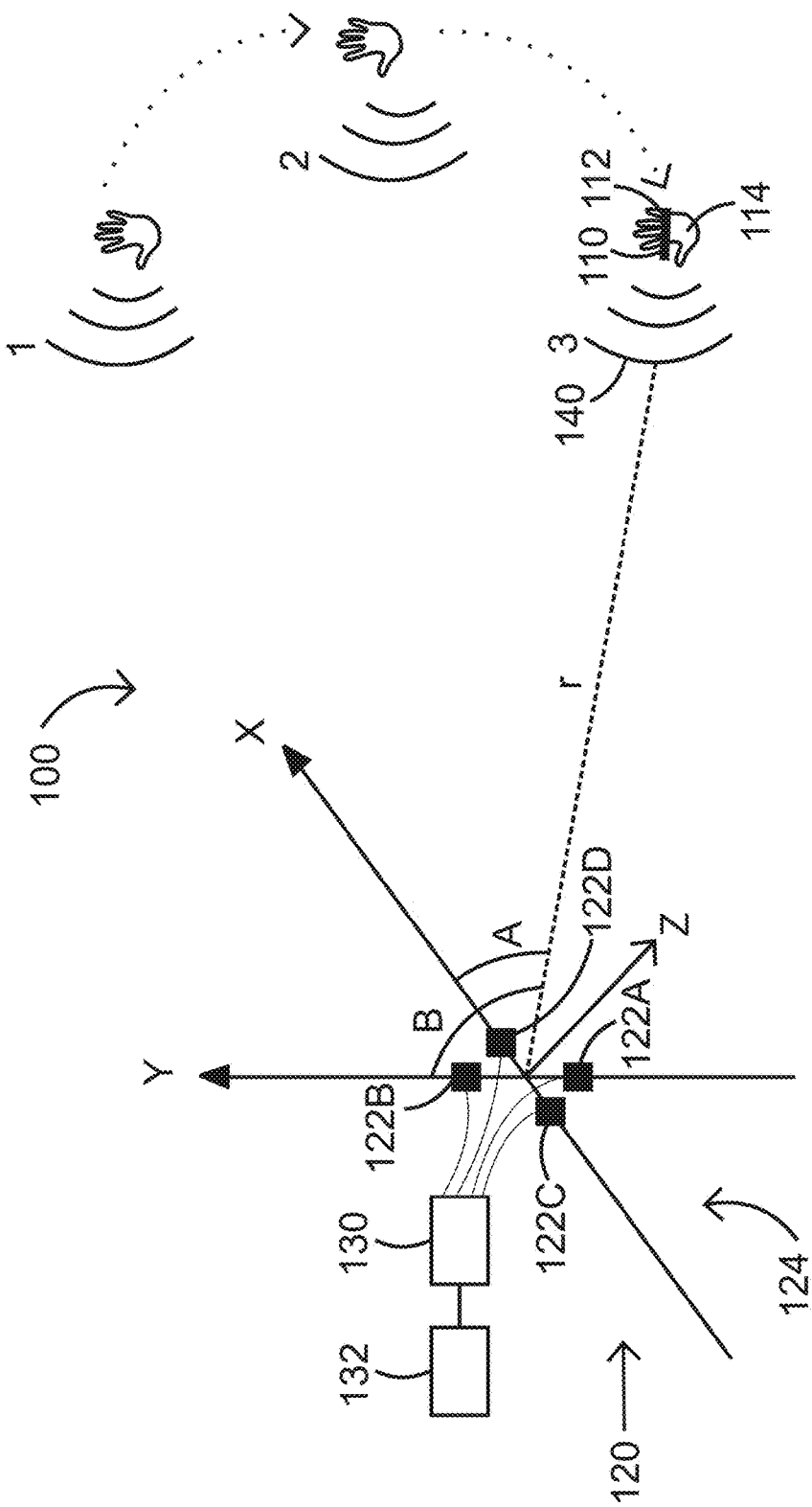
FIG. 1 illustrates an angle-of-arrival based system for detecting a gesture.

In one embodiment, the proposed system uses the fact that a 3-D location of a target (transmitter) can be represented by three elements: (1) a horizontal angle $\alpha \in [0°, 180°]$, (2) a vertical angle $\beta \in [0°, 180°]$, and (3) a distance r measured between the center of a receiver array 124 and a center of the transmitter 110. FIG. 1 shows the system 100 having the handheld transmitter device 110 attached to a hand 114 of a user and the receiver device 120 having the array 124 of sensors 122A-122D (only four are shown in the figure). The transmitter device 110 includes one or more transducers 112. One skilled in the art would understand that the receiver device 120 may include at least two pairs of sensors and the transmitter device 110 may include at least one sensor. FIG. 1 also shows the horizontal angle $\alpha$ and the vertical angle $\beta$ corresponding to hand location at position 3 (axis Y is aligned with the gravity in FIG. 1 and axes X and Z form a plane that is parallel to the ground). Note that FIG. 1 shows hand 114 moving from initial position 1, to intermediate position 2 and then to final position 3. For convenience, the following calculations will use angles $\theta_x = 90° - \alpha$ and $\theta_y = 90° - \beta$ to represent the horizontal and vertical angles in the interval $[-90°, 90°]$.

Further, FIG. 1 shows that the receiver device 120 may include a processor 130 and associated memory 132. The processor 130 is connected to the sensors 122A-122D for receiving the measurement information from the sensors. This information may be stored in the memory 132. Processor 130 may be configured to process the measured information to estimate AoA for the horizontal and vertical angles as discussed later. The memory may be used to store one or more gestures recorded by the sensors and also to store a dictionary of gestures, also discussed later. Further, the processor 130 may run a classifier for calculating which stored gesture corresponds to the measured gesture. While this embodiment is discussed with regard to ultrasound waves 140 being emitted by the transmitter 110 and being recorded by the receiver 120, those skilled in the art would understand that other waves may be used with the same purpose, for example, radio frequency waves, infrared waves, etc. With this configuration of the system 100, the motion tracking part is performed with the transmitter 110 and the receiver 120 while the text recognition part is performed with the processor 130, based on the angle measurements obtained from the receiver 120.

A gesture of the hand 114 can be represented as the variation of the 3-D location of the hand with time, i.e., it can be described by the three variables $[\theta_x(t),\theta_y(t),r(t)]$. Note that each of the three variables $\theta_x(t)$, $\theta_y(t)$ and $r(t)$ changes in a unique way for each given gesture. Using all these three variables is expected to deliver better results compared to using only one or two of them. However, since calculating the distance r between the transmitter 110 and the receiver 120 requires stringent synchronization between the two devices, which adds to the system's complexity, the proposed system utilizes only 2-D AoA information, i.e., two angles $[\theta_x(t),\theta_y(t)]$ to detect and classify the hand gestures.

The system 100 is configured to perform three processes: AoA estimation, outlier rejection and gesture classification. Each of these processes is now discussed in detail.

AoA Estimation

The signal transmitted by the transmitter device 110 consists of multiple frequencies (at least two). In one application, Frequency Hopping Spread Spectrum (FHSS) ultrasonic signals are transmitted from the transmitter 110. The receiver 120 detects these signals and may label the transmitter as idle or active, based on the signal strength using thresholding. After the status of the transmitter is marked as active, a search-based AoA estimation algorithm is run by the processor 130. This estimation algorithm is now discussed. An estimate of the phase difference $\hat{\psi}_{x,i} \in (-\pi,\pi]$ at the $i^{th}$ carrier frequency $f_i$ observed between a sensor 122A and a sensor 122B of the receiver device 120 (see FIG. 2) can be estimated as the angle of the CPS (Cross Power Spectrum) of two signals (waves) 220 and 222:

$$\hat{\psi}_{x,i} = ang(Y_u(f_i) \cdot Y^*_v(f_i)) = \hat{\phi}_{x,i} - 2\pi N_{x,i}, \quad (1)$$

where $Y_u$ and $Y_v$ are the DFT (Discrete Fourier Transform) of the received signals 220 and 222 at sensor u (or 122A) and sensor v (or 122B) of the receiver device 120, "*" indicates the complex conjugate operation, $\hat{\phi}_{x,i}$ is the actual phase difference between the two signals 220 and 222 and $N_{x,i}$ is an integer. The estimation of the horizontal angle α is next discussed. The estimation of the vertical angle β is omitted because it is similar to that of the horizontal angle, except that the signals used for the vertical angle are recorded by a pair of sensors perpendicular to the pair of sensors that record the signals for the horizontal angle.

Figure 2:
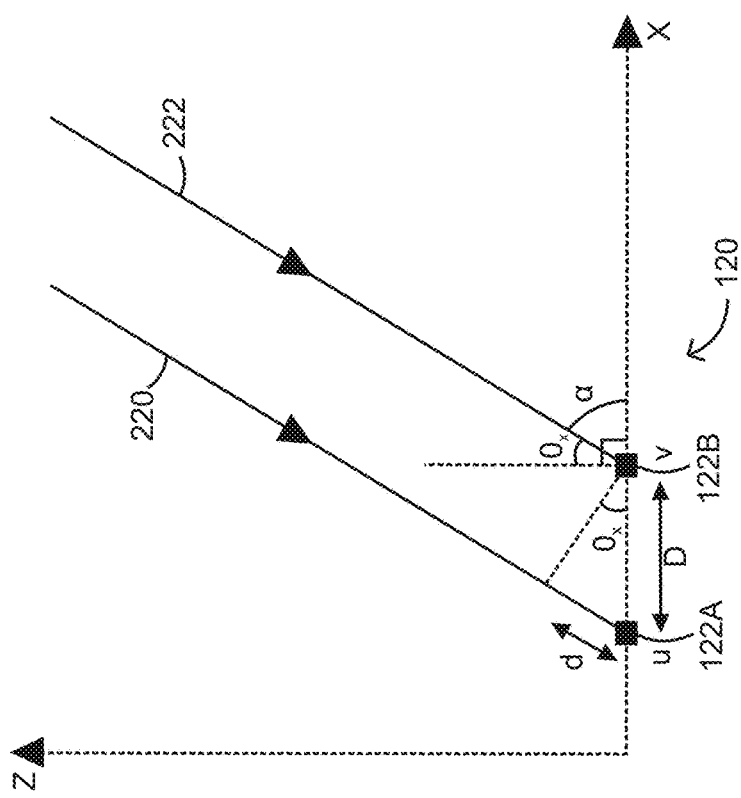
FIG. 2 illustrates plural ultrasound waves being recorded with two sensors and a geometry associated with the waves.

In a far-field scenario (i.e., a configuration in which the transmitter is far from the receiver so that the waves 220 and 222 appear to be parallel at the receiver), as shown in FIG. 2, a relationship between the estimated phase difference $\hat{\phi}$ and the horizontal angle $\theta_x$ can be expressed as:

$$\sin(\hat{\theta}_x) = \frac{d}{D} = \frac{\hat{\phi}_{x,i} c}{2\pi f_i D}, \quad (2)$$

where "d" is the range difference between the transmitter 110 and the two receivers 122A and 122B (see FIG. 2), c is the speed of the ultrasound waves 220 and 222, and D is the distance between the two sensors u (122A) and v (122B) along the X axis. Note that due to the range difference d, the two waves 220 and 222, even if emitted simultaneously by the transmitter 110, arrive with a time difference (i.e., phase difference) at the two receivers u and v. In other words, the time d/c necessary for wave 220 to arrive at sensor u, after wave 222 arrives at sensor v, introduces the actual (estimated) phase difference $\hat{\phi}_{x,i}$ between the two waves. Equation (2) can be used to calculate the AoA. However, to solve this equation, it requires knowledge of $\hat{\phi}_{x,i}$, while only $\hat{\psi}_{x,i}$ can be estimated (see equation (1)). Unless the sensor baseline D is restricted to be less than half of the wavelength of the received frequency, the integer $N_{x,i}$ is not guaranteed to be zero. Therefore, a mechanism to recover the $N_{x,i}$ integer is needed for AoA estimation using phase observations. A method was developed in [7] to recover the integer ambiguity parameters for multi-frequency signals and this idea is used herein to develop an AoA estimator without explicitly calculating the ambiguity integers $N_{x,i}$.

According to this method, the following grid search method may be used to estimate the AoA. The method searches in the range [−90°,90°] for a horizontal angle that matches best the observations. For example, assume that angle θ describes a hypothesized transmitter 110 location. The corresponding calculated phase $\tilde{\psi}$ can be calculated/estimated, based on equations (1) and (2) as:

$$\tilde{\psi}_{x,i}(\theta) = \text{wrap}(\tilde{\phi}_{x,i}(\theta)) = \text{wrap}\left(\frac{2\pi f_i D \sin\theta}{c}\right), \quad (3)$$

where function "wrap" performs the phase wrapping operation in equation (1). For example, the function wrap may be defined, in one application, as a function that when applied to an angle ϕ, it returns the value ϕ−2πN, where N is the closest integer to $$\frac{\phi}{2\pi}.$$

When two integers are equally close to $$\frac{\phi}{2\pi}$$

(by 0.5), the smaller integer is used. After applying equation (3) for all the available frequencies, and over the entire angle range [−90°,90°] (using a suitable step), the final AoA estimate can be obtained as:

$$\theta_x = \underset{\theta}{\arg\min} \sum_{(i)} \left(|\hat{\psi}_{x,i} - \tilde{\psi}_{x,i}(\theta)|\right), \quad (4)$$

where the summation is carried over all the available frequencies $f_i$. Note $\hat{\psi}$ is the phase difference estimated from the observed signals while $\tilde{\psi}$ is the phase difference calculated theoretically based on a hypothesized AoA θ. In this way, the AoA estimation of the horizontal angle $\theta_x$ is achieved. The same process is repeated for the vertical angle $\theta_y$, but using the ultrasound waves recorded by two other sensors, perpendicular to pair of sensors u and v shown in FIG. 2.

Outlier Rejection

Figure 3B:
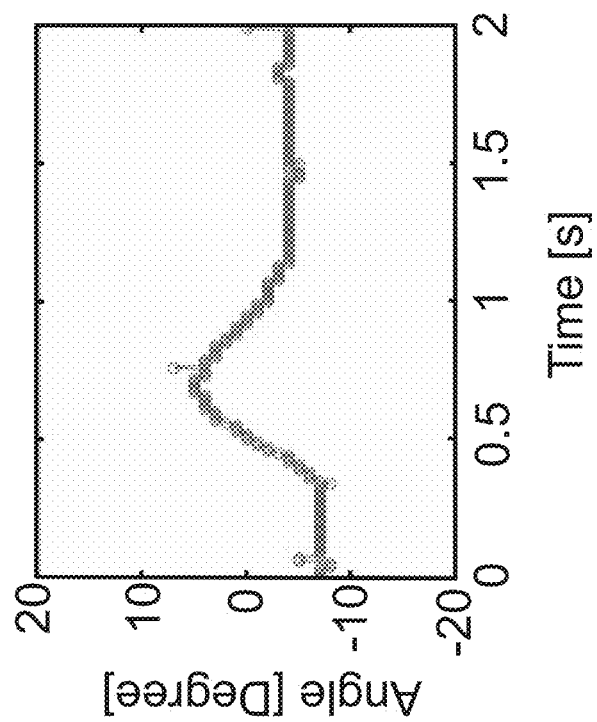
FIGS. 3A and 3B illustrate recorded angles before and after outlier rejection.
Figure 3A:
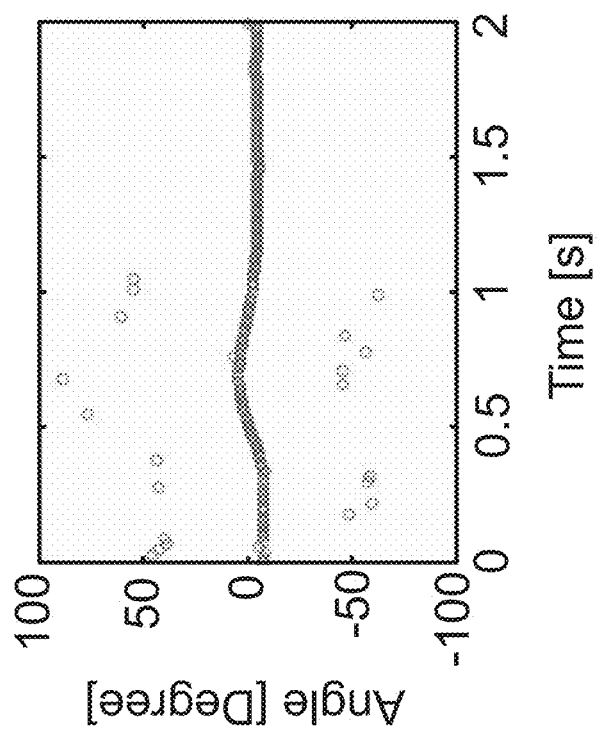

Next, an outlier rejection process may be performed. Due to angle estimation errors, outliers may occur in the angle information. Given that the velocity of the moving target (hand in this case) is limited, any jump in the angle measurement, between two adjacent points, which exceeds a pre-defined threshold can be treated as an outlier. Here, for example, the adopted outlier rejection procedure detects the outliers by thresholding the derivative of $\hat{\theta}_x$ (same applies for $\hat{\theta}_y$) and replacing the outliers with the closest neighbor values. In this respect, FIGS. 3A and 3B show the impact of outlier rejection performed on actual data. FIG. 3A shows the estimated angles before any rejection while FIG. 3B shows the estimated data after outlier were removed using the derivative of the angles. Note that the scale of the Y axis is different for the two figures.

Normalization

In one embodiment, it is possible to preprocessed the angle estimates before sending them to the classifier, to give effective representation of the observed letter. By assuming that the user is writing on a plane that parallels the plane in which the receiver array is located, the following distance r of a projected motion position (a, b) in the plane can be obtained:

$$r^2 = \cos^2(\alpha)r^2 + \cos^2(\beta)r^2 + d_p^2,$$

where $d_p$ is the distance between the two planes and $\alpha$ and $\beta$ are the AoA for the point (a,b). Based on this, the projected motion position (a,b) can be obtained as:

$$\begin{cases} a = \cos(\alpha)r = \cos(\alpha)\dfrac{d_p}{\sqrt{1-\cos^2(\alpha)-\cos^2(\beta)}} \\ b = \cos(\beta)r = \cos(\beta)\dfrac{d_p}{\sqrt{1-\cos^2(\alpha)-\cos^2(\beta)}} \end{cases}.$$

For different letters, the center position and writing duration vary from user to user. In order to make the collected angle information consistent, normalization may be used. If needed, the location vectors a and b will firstly be linearly interpolated into two vectors of length N. This step is necessary so that the dimensionality of the data matches that of the template dictionary. Following this step, the DC component of each vector needs to be removed to make sure that all the vectors are centered around zero. This yields:

$$\begin{cases} a = a - \sum_{j=1}^{N}(a_j)/N \\ b = b - \sum_{j=1}^{N}(b_j)/N \end{cases}.$$

For the next steps, it is possible to use the preprocessed horizontal and vertical location vectors a and b to make inferences about the collected data and to identify the writing pattern present therein.

Gesture Classification

To identify the gesture made by the hand from the AoA calculated above, two methods are used herein. The first method is based on a redundant-dictionary classifier, and the second method is based on neural-network classifier.

Redundant-Dictionary Classification

Figure 4:
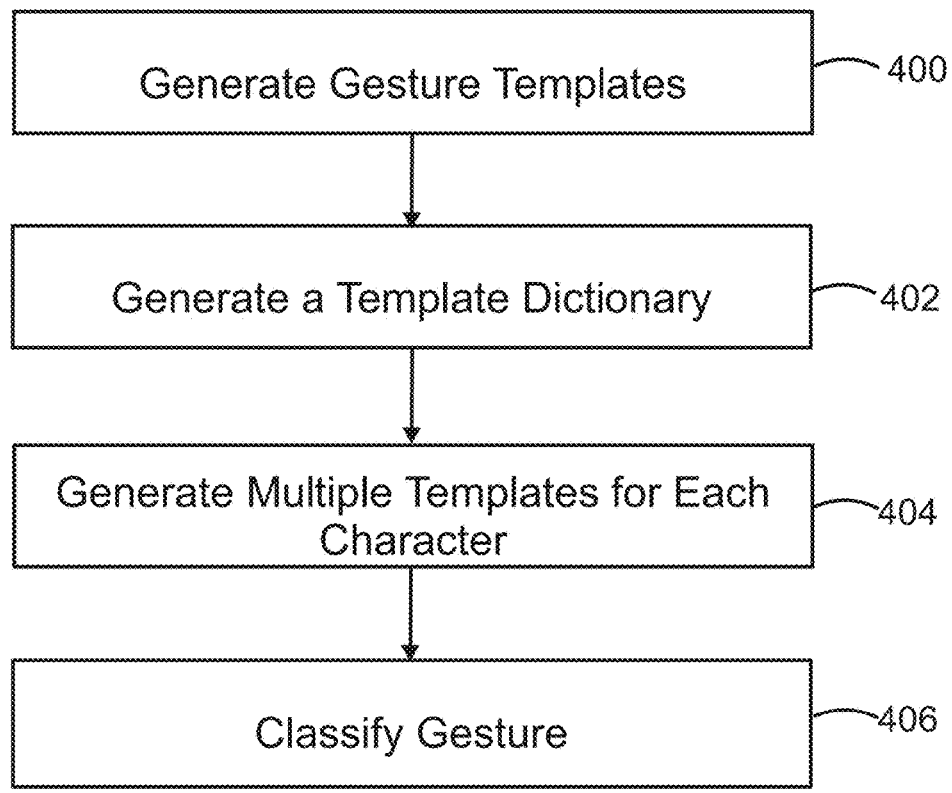
FIG. 4 is a flowchart of a method for tracking and identifying a gesture.
Figure 5:
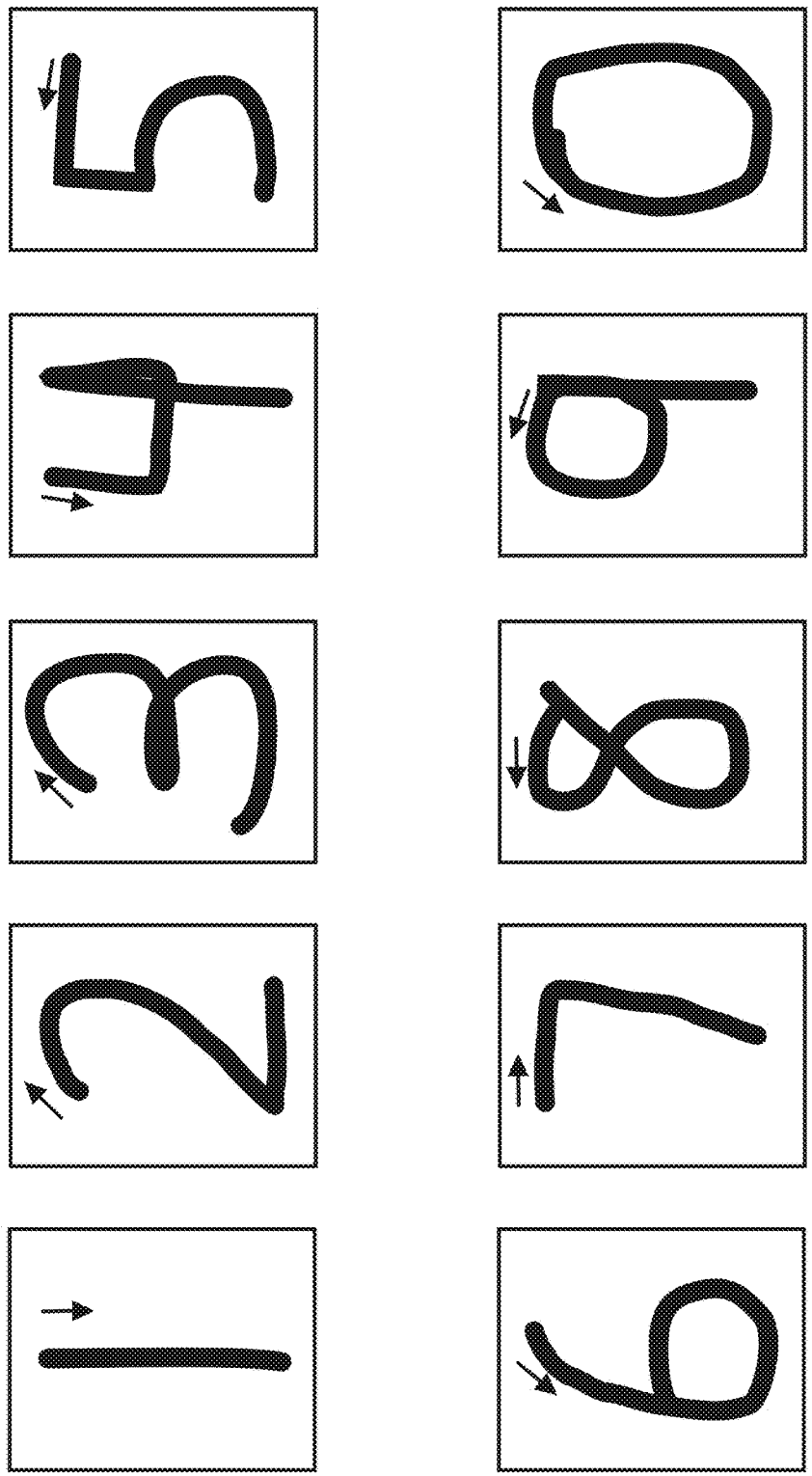
FIG. 5 illustrates various characters identified as gestures.

The redundant-dictionary classification method uses four steps, as illustrated in FIG. 4. First, the method generates in step 400 a plurality of gesture templates. In this system, a gesture is represented by the change in the horizontal and vertical angles with time. When the gesture is an alphanumeric character (as the case for all the gestures considered in this embodiment), the resultant pattern of angle variation depends on the specific way that a gesture is performed. For example, writing a character from left to right results in a different angle sequence from when the same character is written from right to left. In this embodiment, a set of gestures is considered to have a pre-defined movement pattern. FIG. 5 shows various templates of these patterns.

Figure 6:
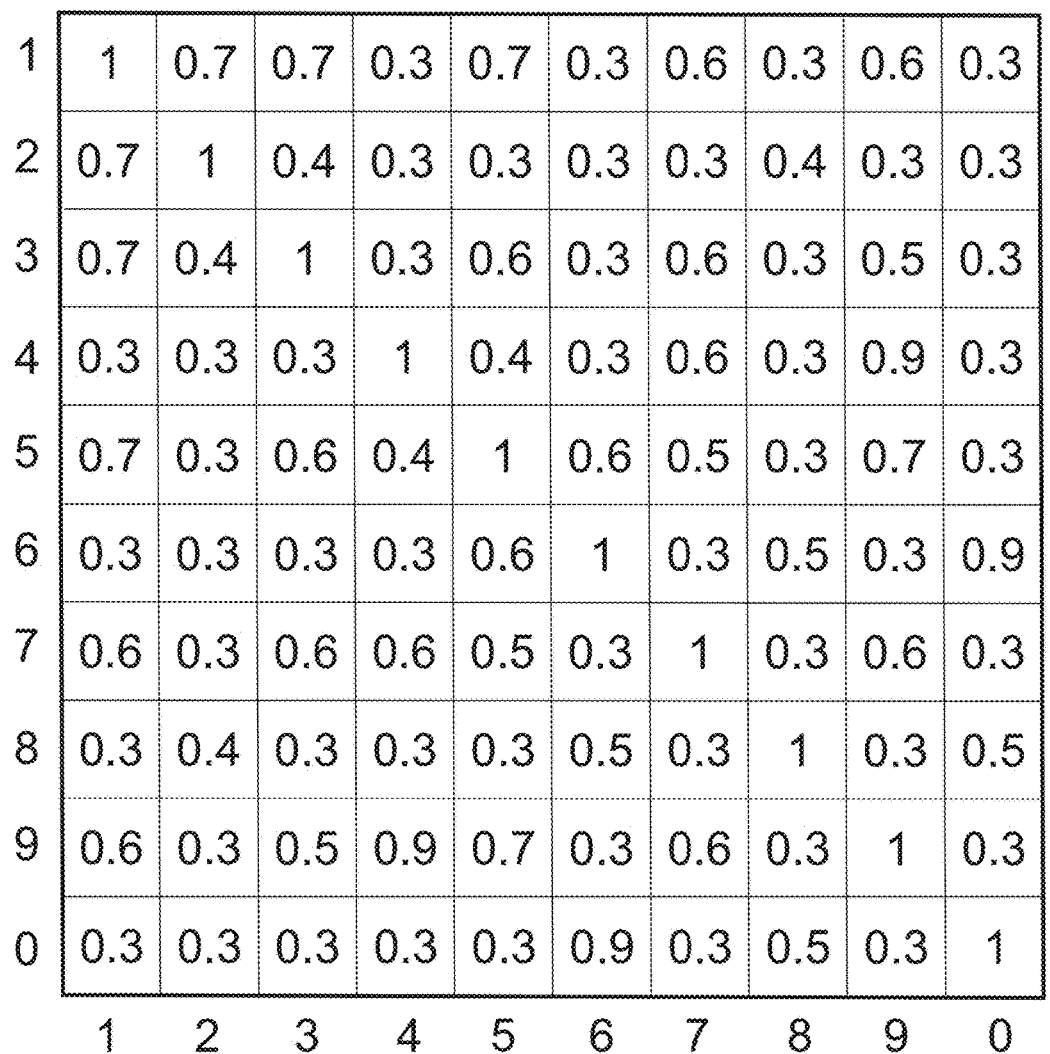
FIG. 6 illustrates a cross-correlation of the various gestures.

A template dictionary is then generated in step 402. As discussed above, each gesture is represented by a sequence of angle measurements $[\hat{\theta}_x(t), \hat{\theta}_y(t)]$. Suppose that there are K measurements for each of the horizontal and vertical angles taken at various time instants t=1, 2, . . . , K. For each gesture, an ideal pair of sequences $[\theta_x(t), \theta_y(t)]$ can be generated assuming certain start and end points, in addition to a gesture timing. Then, a template dictionary can be created by combining the two sequences for each gesture, in a column vector to form a matrix $A_t$ with a size 2K×M, where M is the number of different gestures. The inner-product of the dictionary columns can be obtained as $$B = A_t^T A_t, \quad (5)$$

where B is a M×M matrix. In one application, 10 gestures are considered, i.e., M=10, and each angle sequence consists of K=200 measurements (given that the angles are measured each 10 ms, this is equivalent to a total time of 2 s.). The inner-product matrix indicates how easy or difficult is for a gesture to be distinguished from the others. In this regard, FIG. 6 illustrates the normalized inner products of the columns of the template dictionary for the 10 gestures. It can be seen from this figure that some gesture pairs exhibit relatively high cross-correlation (one indicates highest cross-correlation and zero indicates no cross-correlation), and hence, it is likely that these gestures would be confused with each other.

In step 404, a redundant dictionary is built. A redundant dictionary includes plural templates for each gesture. Even when the users follow the same movement pattern for a given character, the extension of the gesture in both time and space differs from one user to another. To increase the robustness of the recognition method, this step generates multiple templates for each gesture, with the multiple templates being different one from the other. Then, these multiple templates are added to extend the template dictionary. These added templates represent variations of the original templates with different movement speed, timing, and/or starting and ending points. The goal of this step is to make the dictionary redundant, to account for some of the inherent uncertainty in the gestures.

Figure 7A:
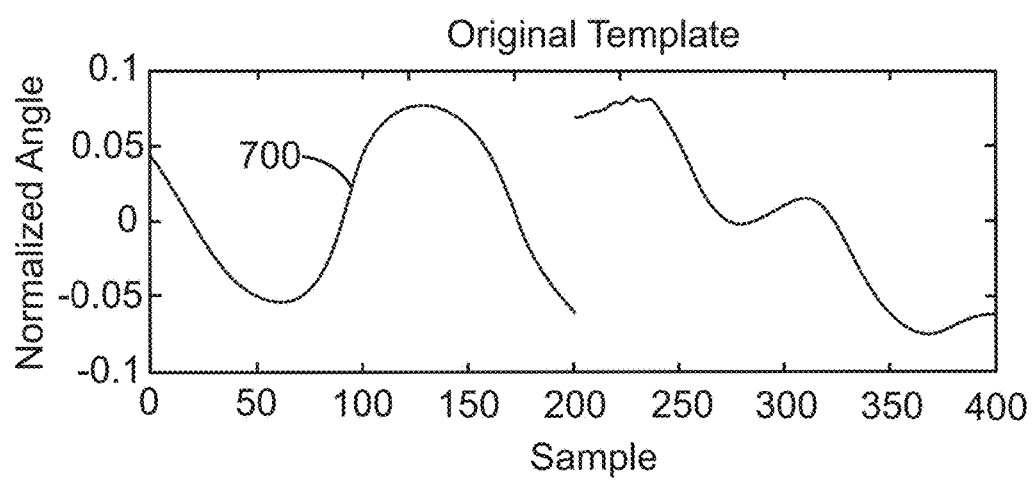
FIG. 7A illustrates a set of angles associated with an original template and FIG. 7B illustrates a set of angles associated with an extended template.
Figure 7B:
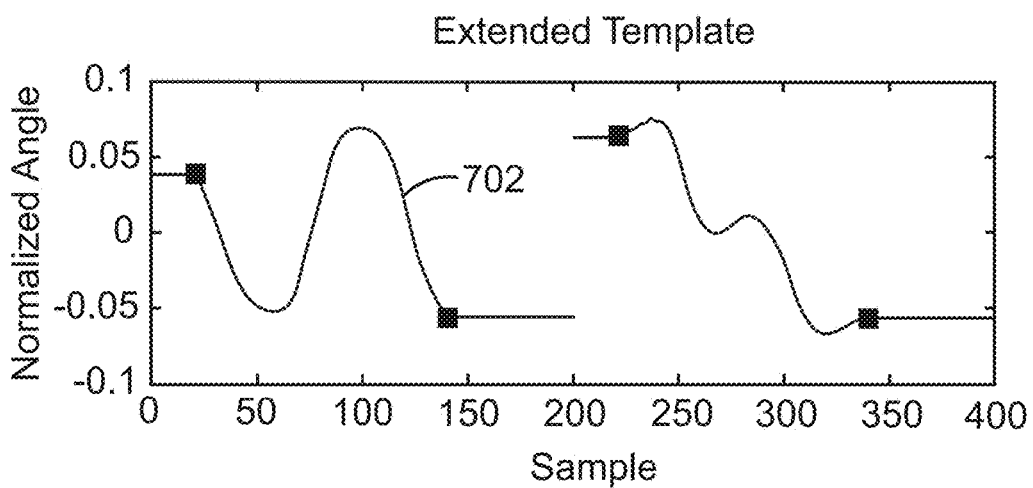

FIG. 7A shows an example of an original template 700 and FIG. 7B shows an extended template 702. Both templates are included in the redundant dictionary templates. The original template 700 is a concatenation of idealistic horizontal and vertical angle sequences. The extended template 702 represents similar information, but with a shorter or longer time duration. Also, the timing of the horizontal and vertical angles in the extended template is generally different.

For example, the extended gesture 702 may be delayed by 20 samples (note that the original template 700 starts at sample one and the extended template 702 starts at sample 21). Also note that the extended template 702 is 80 samples shorter in duration than the original template 700. Other extended templates may have even a shorter duration, but exhibit a similar angle variation pattern from the point the movement starts to the point where it stops. Other values may be used for the delay and the duration of the extended templates. In one application, one or more extended templates are delayed and compressed by multiples of 20 samples to extend the dictionary into a 400×210 redundant dictionary matrix $A_r$. Further, in another application, it is possible to adjust each column of the dictionary to have zero mean and unit second norm. It is also possible to increase a time duration of the extended template.

In step 406, the method receives angles associated with a gesture, compare the gesture with the template dictionary and classifies the gesture as being associated with a certain character. Usually, one gesture lasts 1-2 seconds, and thus, each gesture can be represented using at most 200 horizontal angle data points and 200 vertical angle data points. One skilled in the art would understand that more or less data points may be selected. In cases where the signal is received for less than 2 seconds, zeros are added (i.e., the data is padded) to generate a 400×1 vector g of the concatenated angle observations. To carry out the classification task, a matrix-vector multiplication operation is performed. For example, a peak r can be calculated as:

$$r = A_r^T g. \qquad (6)$$

The location of the highest value (maximum) of the peak r vector may be used as an indicator of the gesture type. In other words, the gesture, when correlated with its corresponding template, generates a high peak while the same gesture, when correlated with a different template, generates a low peak. After the measured gesture is correlated with all the templates in the dictionary, as indicated by equation (6), the maximum inner product value for peak r indicates the template that is most likely describing the measured gesture.

For comparison reasons, the same gesture is analyzed with a neural-network based classification scheme. Such a neural-network scheme involves a first step of training the data. Three models $M_{angle}$, $M_{std}$ and $M_{cons}$ are built based on different training data sets. The model $M_{angle}$ is trained using normalized angle data to compare with the dictionary-based classifier used for the method illustrated in FIG. 4, whereas the other two models are trained using images. The model $M_{std}$ is trained using MNIST [8] database, while model $M_{cons}$ is trained using reconstructed gesture images. A stacked autoencoder model from Matlab Neural Network Toolbox [9] with two hidden layers, as well as a softmax layer, is implemented and used with each of the three models.

Figure 8B:
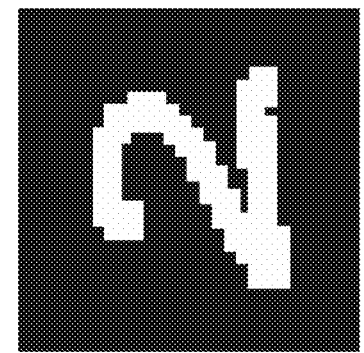
FIG. 8B illustrates a digital image of the gesture recorded with the receiver.
Figure 8D:
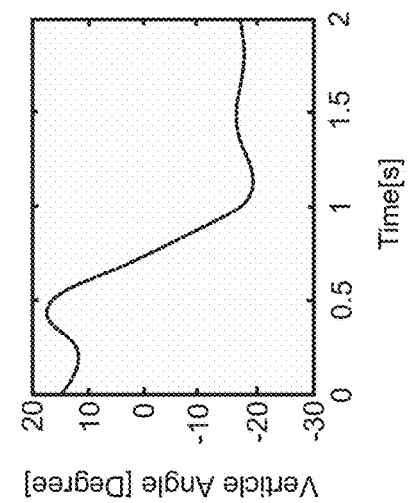
FIG. 8D illustrates the estimated vertical angle versus time.
Figure 8A:
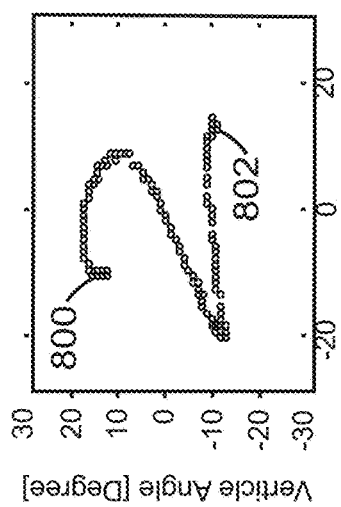
FIG. 8A illustrates horizontal and vertical angles recorded with a receiver in response to a movement of a transmitter.
Figure 8C:
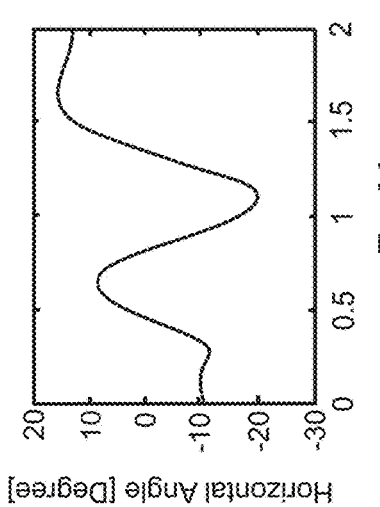
FIG. 8C illustrates the estimated horizontal angle versus time.

Next, the neural-network scheme performs image reconstruction. A gesture image is reconstructed placing the AoA horizontal and vertical angle measurements on the two axes of a 2-D coordinate system and marking the points in the 2-D plane where a pair of horizontal and vertical angles occurs. An example is shown in FIG. 8A, where the gesture starts from position 800 and ends at position 802. Note that each point shown in FIG. 8A corresponds to a horizontal angle $\theta_x$, and a vertical angle $\theta_y$ measured by the receiver 120 and calculated, in a processor 130 associated with the receiver device 120, based on equation (4). A 28×28 pixels binary version of the image is shown in FIG. 8B, while AoA measurements obtained with the receiver device 120 are plotted in FIGS. 8C and 8D (FIG. 8C shows the calculated horizontal angle and FIG. 8D shows the calculated vertical angle). FIGS. 8A-8D not only validate the concept of AoA-based gesture recognition, but also suggests using the reconstructed images in the gesture classification process.

Figure 9:
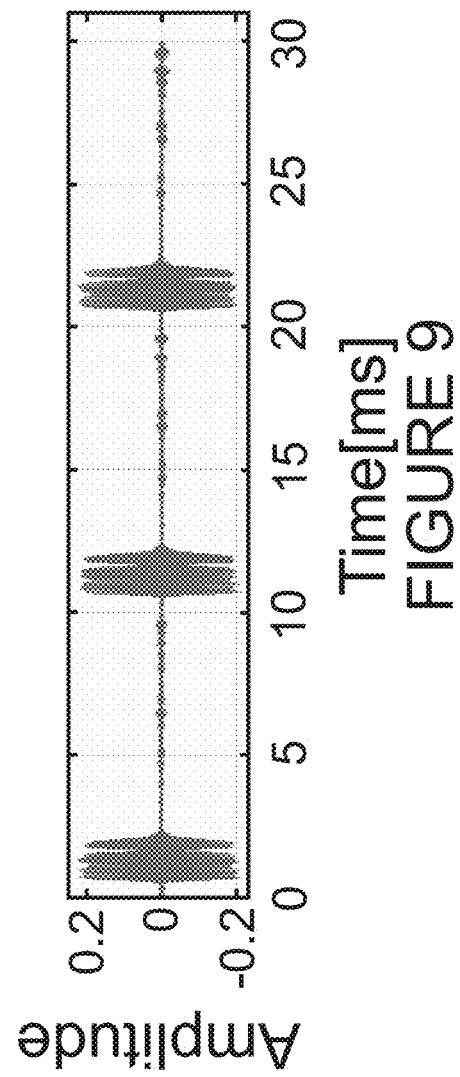
FIG. 9 illustrates an amplitude of a received signal in the time domain.

Classification results obtained from the three models used in the context of the neural-network classification scheme and using the dictionary-based classifier (illustrated in FIG. 4) are now discussed. When the transmitter 110 (in FIG. 1) is triggered, a series of pulses are sent from the ultrasound transducers 112. Each pulse may last for about 1.5 ms and may be repeated 100 times per second. Other values may be used. The transmitted signal 140 may consist of 3 Hanning-windowed sinusoidals of frequencies of 20 kHz, 21.5 kHz and 23 kHz. The receiver array 124 of four elements 122 arranged as two orthogonal pairs (note that FIG. 1 shows two elements 122 to be located along axis X and two other elements 122 to be located along axis Y) collect the signals at a sampling rate of 192 kHz. FIG. 9 shows an example of the amplitude of the received signal in the time domain.

To evaluate the performance of the proposed system, 10 volunteers were asked to perform gestures according to the following instructions:

Air-write each number based on its corresponding template;

The duration of each gesture should be between 1 and 2 seconds;

Sit around 1 meter in front of the receiver array 124;

The movement of the hands should be within a square of 80 cm by 80 cm centered around the receiver array; and Repeat each gesture 10 times with a break after each gesture.

All the experiments were carried out in a typical office room with a temperature around 24° C. and a set of total 1000 gestures was acquired. After removing outliers, each gesture was converted to a 28×28 binary image. From the 100 gestures of each volunteer, 50 were picked up for the training set and the remaining 50 were left for testing. The model $M_{std}$ was trained using binary MNIST data with a threshold of 0.15 while $M_{angle}$ and $M_{cons}$ were trained with the same gesture set but with two different data format (i.e., angle measurements and 28×28 images).

A comparison between the results of the three neural network models used above and the redundant-dictionary method presented in FIG. 4 used the same testing data. However, before presenting the results of the comparison, tests were conducted to evaluate the AoA estimation accuracy. Because the array 124 is symmetric, there is no need to present the results for the vertical angle. Thus, in the following, only the results for the horizontal angle are illustrated. The transmitter 110 was placed 1.5 meters away from the receiver array 124 and 7 angles from 0° to 75° were tested, with a step of 15°, by changing the location of the transmitter 110 from one position to another as illustrated in FIG. 1. Each angle was measured 200 times and the results are summarized in Table I in FIG. 10. Note that RMSE in Table 1 stands for root-mean-square error, Bias is the statistical bias, an STD is the standard deviation, which indicates the dispersion of the data.

Figure 11:
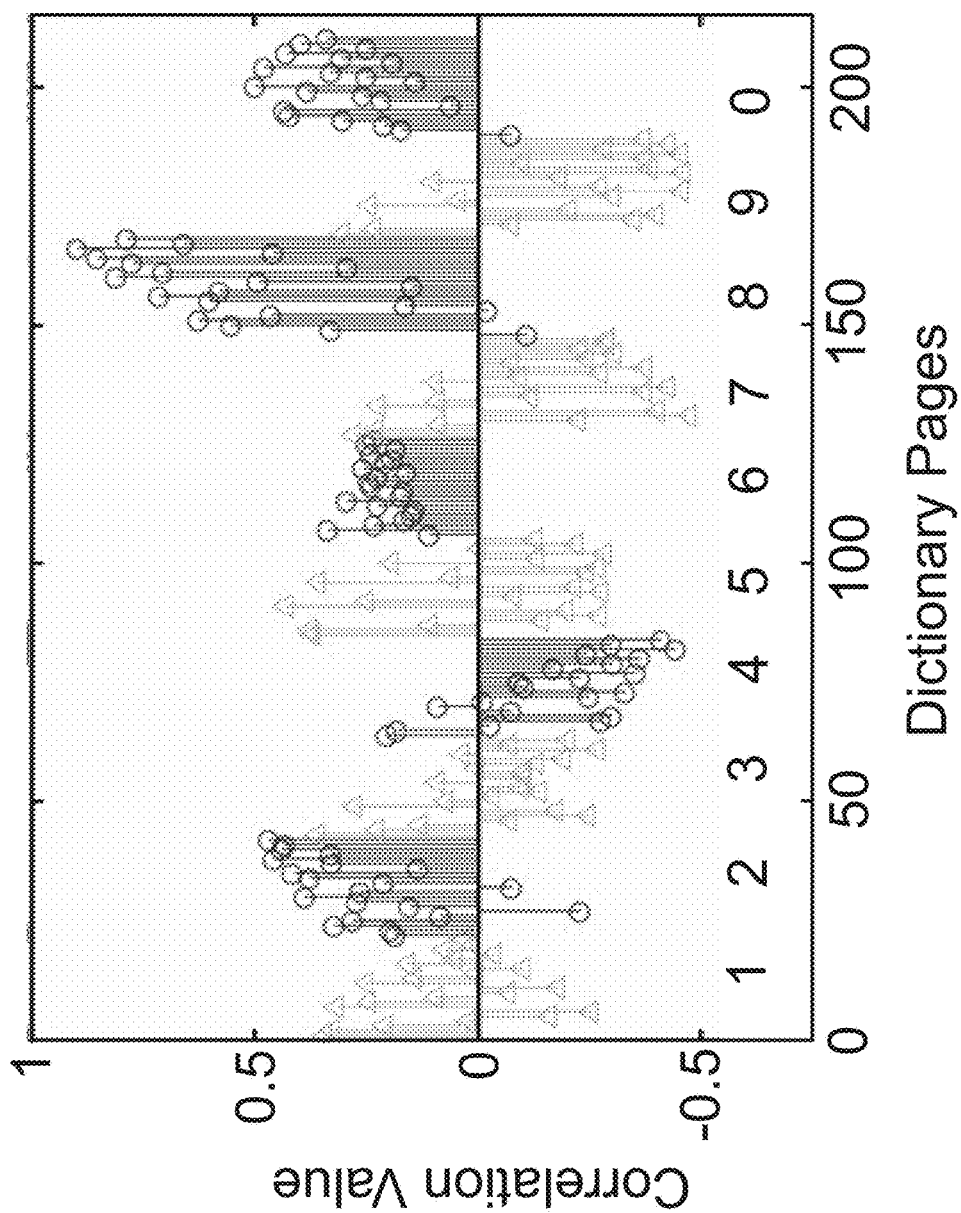
FIG. 11 illustrates a correlation value of the gestures in a dictionary.

A classification result obtained for the number "8" using the redundant-dictionary approach of FIG. 4 is shown in FIG. 11, which plots the correlation r given by equation (6). The large values in the interval (148, 168) indicate that the estimate gesture representation g is more correlated with the templates representing the gesture "8", which is the correct gesture.

As an example, a confusion matrix of the redundant dictionary classifier, which gives an overall accuracy of 95.5%, is shown in Table II in FIG. 12. It can be seen that the highest error rate occurs for the pair "1" and "7" and "4" and "9". Even so, the confusion value is small relative to the correct pairs.

A summary of the results for the 4 classifiers that were tested is shown in Table III, in FIG. 13. From the table, it can be concluded that the difference between gestures and the hand-written digit database causes unfavorable performance in the $M_{std}$ model, which uses standard images of the numbers 0-9 for training. The redundant dictionary approach proposed in this application is pretty accurate, giving an accuracy of 95.5%, actually the highest of the four tested models. An advantage of this dictionary-based classifier requires less computational resources and no training. Note that any neural-network approach requires intense computational capabilities and extensive training.

Figure 14:
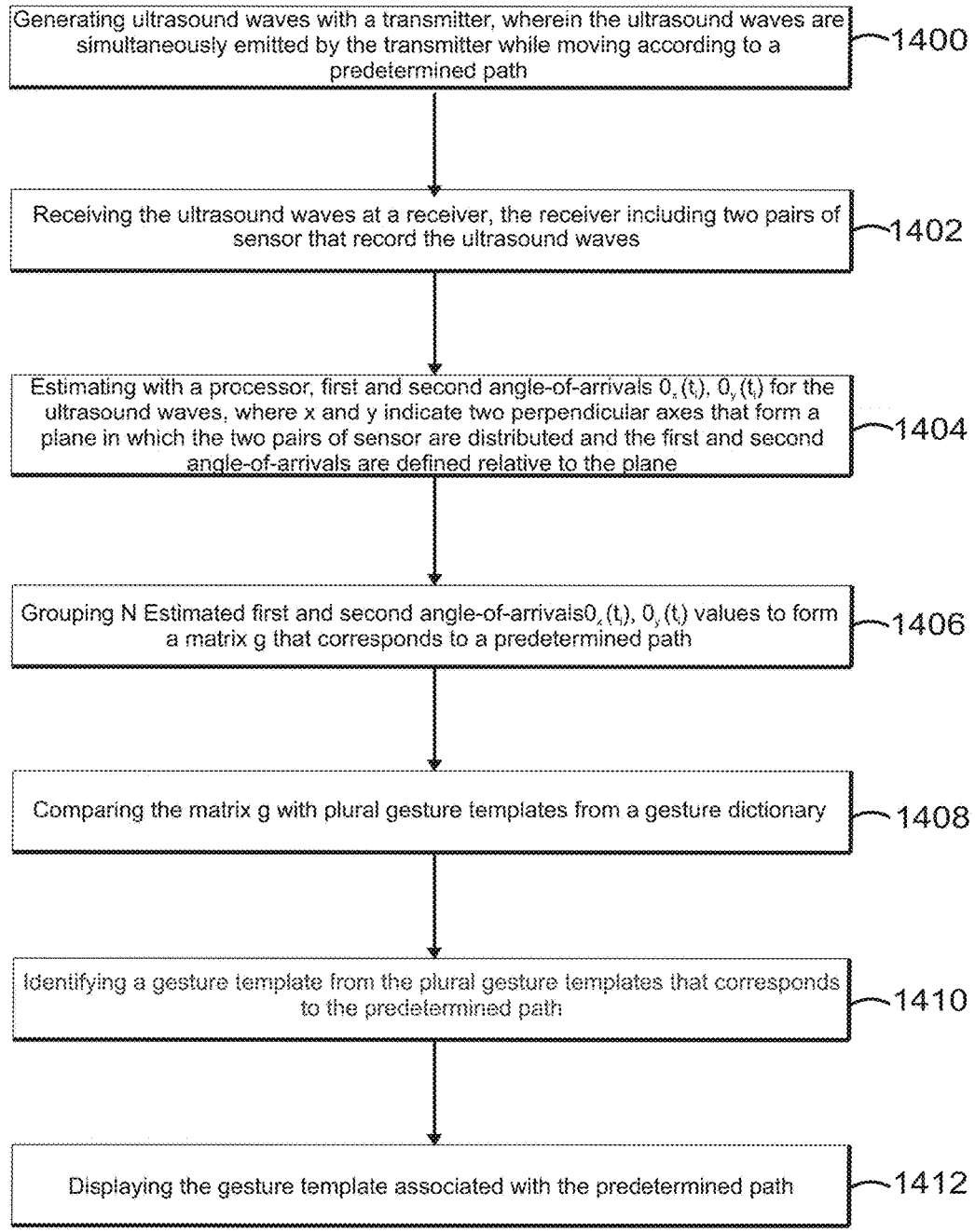
FIG. 14 is a flowchart of a method for identifying a gesture.

A method for gesture recognition using angle-of-arrival information is now discussed with regard to FIG. 14. The method includes a step 1400 of generating ultrasound waves with a transmitter, wherein the ultrasound waves are simultaneously emitted by the transmitter while moving according to a predetermined path, a step 1402 of receiving the ultrasound waves at a receiver 120, the receiver 120 including two pairs of sensors that record the ultrasound waves, a step 1404 of estimating with a processor 130, first and second angle-of-arrivals $\theta_x(t_i), \theta_y(t_i)$ for the ultrasound waves 220, 222, where x and y indicate two perpendicular axes that form a plane in which the two pairs of sensors are distributed and the first and second angle-of-arrivals are defined relative to the plane, a step 1406 of grouping N estimated first and second angle-of-arrivals $\theta_x(t_i), \theta_y(t_i)$ values to form a matrix g that corresponds to the predetermined path, a step 1408 of comparing the matrix g with plural gesture templates from a gesture dictionary, a step 1410 of identifying a gesture template from the plural gesture templates that corresponds to the predetermined path, and a step 1412 of displaying the gesture template associated with the predetermined path.

The ultrasound waves have plural frequencies. In one application, the ultrasound waves are recorded at 100 different time instants. The predetermined path corresponds to an alphanumeric character and the transmitter may be a remote control. In one application, the first angle-of-arrival is a horizontal angle and the second angle-of-arrival is a vertical angle, relative to a system of reference that includes the x and y axes. The step of estimating may includes searching a given angle range [−90°,90°] to find the first angle-of-arrival by using a phase wrapping operation applied to (1) a given frequency fi of the ultrasound waves, (2) a first distance between two sensors of a first pair of sensors, and (3) a speed c of the ultrasound waves between the receiver and the transmitter. The method may further include a step of searching the given angle range [−90°,90°] to find the second angle-of-arrival by using the phase wrapping operation applied to (1) the given frequency fi, (2) a second distance between two sensors of a second pair of sensors, and (3) the speed c. The method may also include a step of rejecting first and second angle-of-arrivals that exceed a predefined threshold. Furthermore, the method may include a step of defining a column vector At to include the N first and second angle-of-arrivals $\theta_x(t_i), \theta_y(t_i)$ values, a step of calculating inner-products B of dictionary columns by multiplying a complex conjugate of the column vector At with the column vector At, and/or a step of applying a transposed of the column vector At to the matrix g to obtain a vector peak r. The step of identifying may includes using a highest value of the vector peak r to associate the predetermined path with the gesture template.

Figure 15:
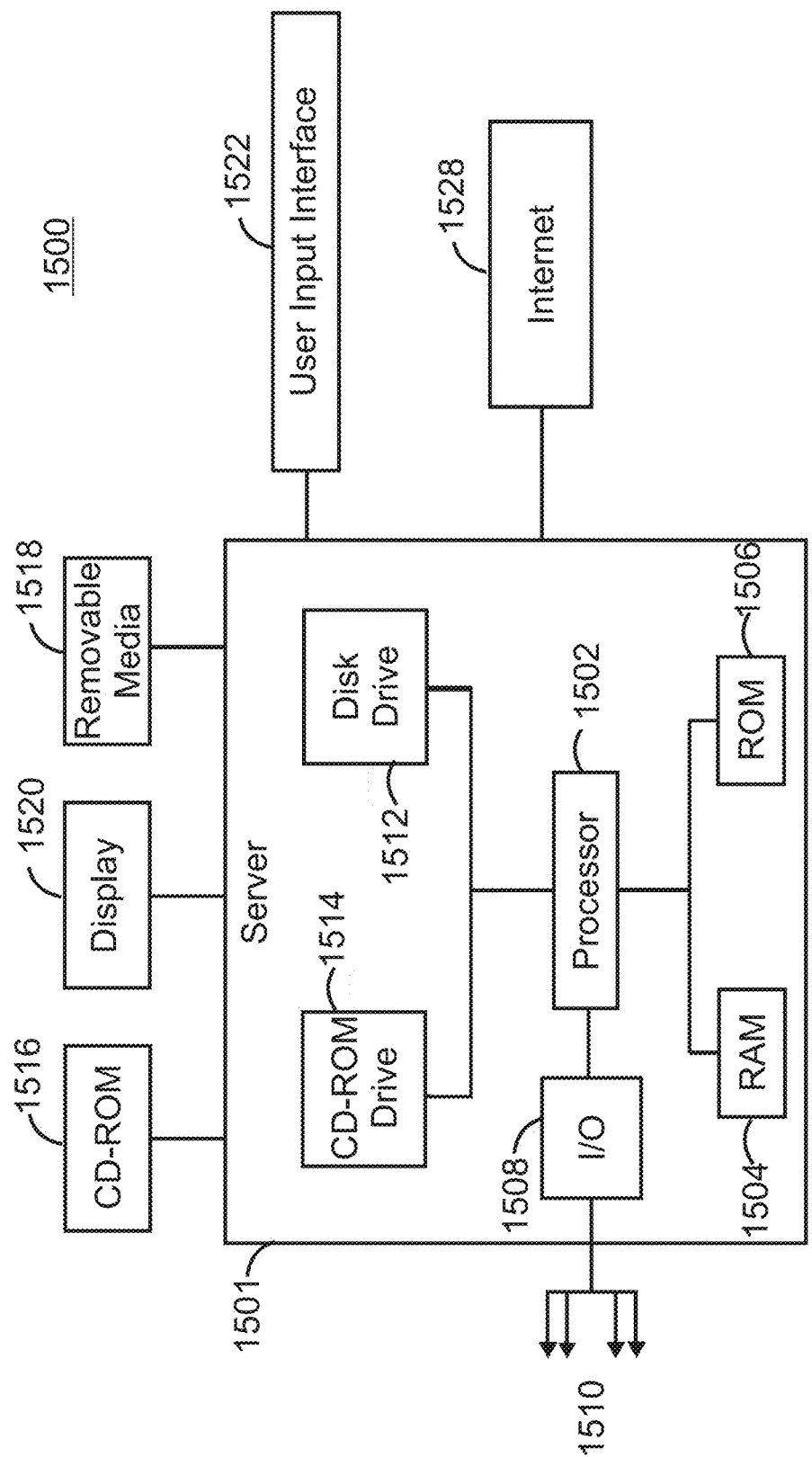
FIG. 15 is a schematic of a controller that identifies the gesture.

The above-discussed procedures and methods may be implemented in a computing device or controller as illustrated in FIG. 15. Hardware, firmware, software or a combination thereof may be used to perform the various steps and operations described herein. Computing device 1500 of FIG. 15 is an exemplary computing structure that may be used in connection with such a system.

Exemplary computing device 1500 suitable for performing the activities described in the exemplary embodiments may include a server 1501. Such a server 1501 may include a central processor (CPU) 1502 coupled to a random access memory (RAM) 1504 and to a read-only memory (ROM) 1506. ROM 1506 may also be other types of storage media to store programs, such as programmable ROM (PROM), erasable PROM (EPROM), etc. Processor 1502 may communicate with other internal and external components through input/output (I/O) circuitry 1508 and bussing 1510 to provide control signals and the like. Processor 1502 carries out a variety of functions as are known in the art, as dictated by software and/or firmware instructions. For example, bussing 1510 may be connected to the sensors 122 shown in FIG. 1.

Server 1501 may also include one or more data storage devices, including hard drives 1512, CD-ROM drives 1514 and other hardware capable of reading and/or storing information, such as DVD, etc. In one embodiment, software for carrying out the above-discussed steps may be stored and distributed on a CD-ROM or DVD 1516, a USB storage device 1518 or other form of media capable of portably storing information. These storage media may be inserted into, and read by, devices such as CD-ROM drive 1514, disk drive 1512, etc. Server 1501 may be coupled to a display 1520, which may be any type of known display or presentation screen, such as LCD, plasma display, cathode ray tube (CRT), etc. A user input interface 1522 is provided, including one or more user interface mechanisms such as a mouse, keyboard, microphone, touchpad, touch screen, voice-recognition system, etc.

Server 1501 may be coupled to other devices, such as a smart device, e.g., a phone, tv set, computer, etc. The server may be part of a larger network configuration as in a global area network (GAN) such as the Internet 1528, which allows ultimate connection to various landline and/or mobile computing devices.

The disclosed embodiments provide methods and mechanisms for air-writing and associating the air-written characters with template gestures stored in a gesture dictionary. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] S. Gupta, D. Morris, S. Patel, and D. Tan, "Soundwave: using the doppler effect to sense gestures," in Proceedings of the SIGCHI Conference on Human Factors in Computing Systems. ACM, 2012, pp. 1911-1914.
[2] Y. Qifan, T. Hao, Z. Xuebing, L. Yin, and Z. Sanfeng, "Dolphin: Ultrasonic-based gesture recognition on smartphone platform," in Computational Science and Engineering (CSE), 2014 IEEE 17th International Conference on. IEEE, 2014, pp. 1461-1468.
[3] T. G. Zimmerman, J. Lanier, C. Blanchard, S. Bryson, and Y. Harvill, "A hand gesture interface device," in ACM SIGCHI Bulletin, vol. 18, no. 4. ACM, 1987, pp. 189-192.
[4] R.-H. Liang and M. Ouhyoung, "A real-time continuous gesture recognition system for sign language," in Automatic Face and Gesture Recognition, 1998. Proceedings. Third IEEE International Conference on. IEEE, 1998, pp. 558-567.
[5] M. Chen, G. AlRegib, and B.-H. Juang, "Air-writing recognition part i: Modeling and recognition of characters, words, and connecting motions," IEEE Transactions on Human-Machine Systems, vol. 46, no. 3, pp. 403-413, 2016.
[6] X. Zhang, Z. Ye, L. Jin, Z. Feng, and S. Xu, "A new writing experience: Finger writing in the air using a kinect sensor," IEEE MultiMedia, vol. 20, no. 4, pp. 85-93, 2013.
[7] T. Ballal and C. J. Bleakley, "Doa estimation for a multi-frequency signal using widely-spaced sensors," in Signal Processing Conference, 2010 18th European. IEEE, 2010, pp. 691-695.
[8] Y. LeCun, C. Cortes, and C. J. Burges, "The mnist database of handwritten digits," 1998.
[9] H. Demuth and M. Beale, "Matlab neural network toolbox users guide version 6. the mathworks inc," 2009

What is claimed is:

1. A method for gesture recognition using angle-of-arrival information, the method comprising:
generating ultrasound waves with a transmitter, wherein the ultrasound waves are simultaneously emitted by the transmitter while moving according to a predetermined path;
receiving the ultrasound waves at a receiver, the receiver including two pairs of sensors that record the ultrasound waves;
estimating with a processor, first and second angle-of-arrivals $\theta_x(t_i), \theta_y(t_i)$ for the ultrasound waves, where x and y indicate two perpendicular axes that form a plane in which the two pairs of sensors are distributed and the first and second angle-of-arrivals are defined relative to the plane;
grouping N estimated first and second angle-of-arrivals $\theta_x(t_i), \theta_y(t_i)$ values to form a matrix g that corresponds to the predetermined path;
comparing the matrix g with plural gesture templates from a gesture dictionary;
identifying a gesture template from the plural gesture templates that corresponds to the predetermined path; and
displaying the gesture template associated with the predetermined path.

2. The method of claim 1, wherein the ultrasound waves have plural frequencies.

3. The method of claim 1, wherein the ultrasound waves are recorded at 100 different time instants.

4. The method of claim 1, wherein the predetermined path corresponds to an alphanumeric character.

5. The method of claim 1, wherein the transmitter is a remote control.

6. The method of claim 1, wherein the first angle-of-arrival is a horizontal angle and the second angle-of-arrival is a vertical angle, relative to a system of reference that includes the x and y axes.

7. The method of claim 1, wherein the step of estimating comprises:
searching a given angle range [−90°,90°] to find the first angle-of-arrival by using a phase wrapping operation applied to (1) a given frequency $f_i$ of the ultrasound waves, (2) a first distance between two sensors of a first pair of sensors, and (3) a speed c of the ultrasound waves between the receiver and the transmitter.

8. The method of claim 7, further comprising:
searching the given angle range [−90°,90°] to find the second angle-of-arrival by using the phase wrapping operation applied to (1) the given frequency $f_i$, (2) a second distance between two sensors of a second pair of sensors, and (3) the speed c.

9. The method of claim 1, further comprising:
rejecting first and second angle-of-arrivals that exceed a predefined threshold.

10. The method of claim 1, further comprising:
defining a column vector $A_t$ to includes the N first and second angle-of-arrivals $\theta_x(t_i), \theta_y(t_i)$ values.

11. The method of claim 10, further comprising:
calculating inner-products B of dictionary columns by multiplying a complex conjugate of the column vector $A_t$ with the column vector $A_t$.

12. The method of claim 10, further comprising:
applying a transposed of the column vector $A_t$ to the matrix g to obtain a vector peak r.

13. The method of claim 12, wherein the step of identifying comprises:
using a highest value of the vector peak r to associate the predetermined path with the gesture template.

14. A system for gesture recognition using angle-of-arrival information, the system comprising:
a transmitter that generates ultrasound waves, wherein the ultrasound waves are simultaneously emitted by the transmitter while moving according to a predetermined path;
a receiver that receives the ultrasound waves, the receiver including two pairs of sensors that record the ultrasound waves; and
a processor connected to the receiver and configured to estimate first and second angle-of-arrivals $\theta_x(t_i), \theta_y(t_i)$ for the ultrasound waves, where x and y indicate two perpendicular axes that form a plane in which the two pairs of sensors are distributed and the first and second angle-of-arrivals are defined relative to the plane,
group N estimated first and second angle-of-arrivals $\theta_x(t_i), \theta_y(t_i)$ values to form a matrix g that corresponds to the predetermined path,
compare the matrix g with plural gesture templates from a gesture dictionary, and
identify a gesture template from the plural gesture templates that corresponds to the predetermined path.

15. The system of claim 14, wherein the ultrasound waves have plural frequencies.

16. The system of claim 14, wherein the ultrasound waves are recorded at 100 different time instants.

17. The system of claim 14, wherein the predetermined path corresponds to an alphanumeric character.

18. The system of claim 14, wherein the transmitter is a remote control.

19. The system of claim 14, wherein the first angle-of-arrival is a horizontal angle and the second angle-of-arrival is a vertical angle, relative to a system of reference that includes the x and y axes.

20. A non-transitory computer readable medium including computer executable instructions, wherein the instructions, when executed by a processor, implement instructions for gesture recognition using angle-of-arrival information, comprising:
- instructions for generating ultrasound waves with a transmitter, wherein the ultrasound waves are simultaneously emitted by the transmitter while moving according to a predetermined path;
- instructions for receiving the ultrasound waves at a receiver, the receiver including two pairs of sensors that record the ultrasound waves;
- instructions for estimating with a processor, first and second angle-of-arrivals $\theta_x(t_i), \theta_y(t_i)$ for the ultrasound waves, where x and y indicate two perpendicular axes that form a plane in which the two pairs of sensors are distributed and the first and second angle-of-arrivals are defined relative to the plane;
- instructions for grouping N estimated first and second angle-of-arrivals $\theta_x(t_i), \theta_y(t_i)$ values to form a matrix g that corresponds to the predetermined path;
- instructions for comparing the matrix g with plural gesture templates from a gesture dictionary;
- instructions for identifying a gesture template from the plural gesture templates that corresponds to the predetermined path; and
- instructions displaying the gesture template associated with the predetermined path.

* * * * *